United States Patent [19]
Hecht

[11] 3,776,637
[45] Dec. 4, 1973

[54] CIRCULAR INVOLUTE REFLECTOR FOR PROVIDING A VARIABLE PATHLENGTH

[75] Inventor: Richard Hecht, Bloomfield, Conn.

[73] Assignee: United Aircraft Corporation, East Hartford, Conn.

[22] Filed: Dec. 14, 1972

[21] Appl. No.: 315,039

[52] U.S. Cl. .................. 356/106, 350/007, 350/293
[51] Int. Cl. .......................... G02b 5/10, G01b 9/02
[58] Field of Search ........... 350/293–296, 288–289; 356/106–109

[56] References Cited
UNITED STATES PATENTS

| | | | |
|---|---|---|---|
| 3,469,924 | 9/1969 | Haswell | 356/106 R |
| 3,472,597 | 10/1969 | Whitten Jr. | 356/106 R |
| 3,535,041 | 10/1970 | Webb (Schindler) | 356/106 R |

*Primary Examiner*—Ronald L. Wilbert
*Assistant Examiner*—Steven Morrison
*Attorney*—Anthony J. Criso

[57] ABSTRACT

A rotatable reflection surface in the form of a circular involute is disclosed. The reflector provides a variable path-length for a beam of radiant energy over a range that is related to the change in radius of curvature of the involute. A general description of the physical characteristics of the reflector as well as a mathematical verification of these characteristics is provided. The reflector operation is discussed and several immediately applicable embodiments including an optical pathlength modulator, a Fourier spectrometer and an optical heterodyning receiving system are shown.

5 Claims, 6 Drawing Figures

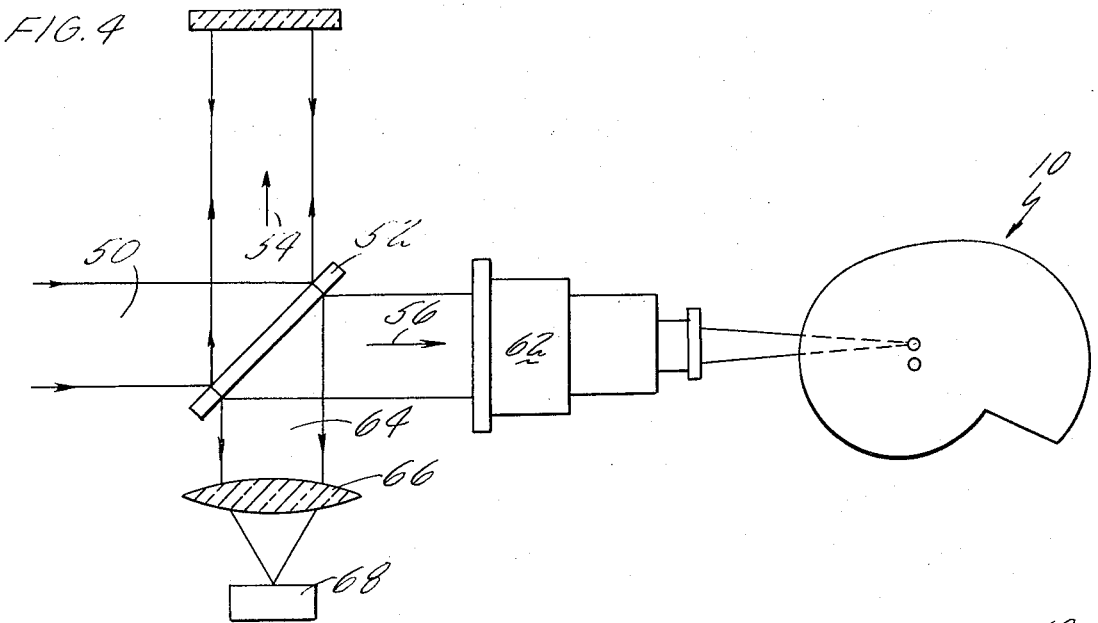
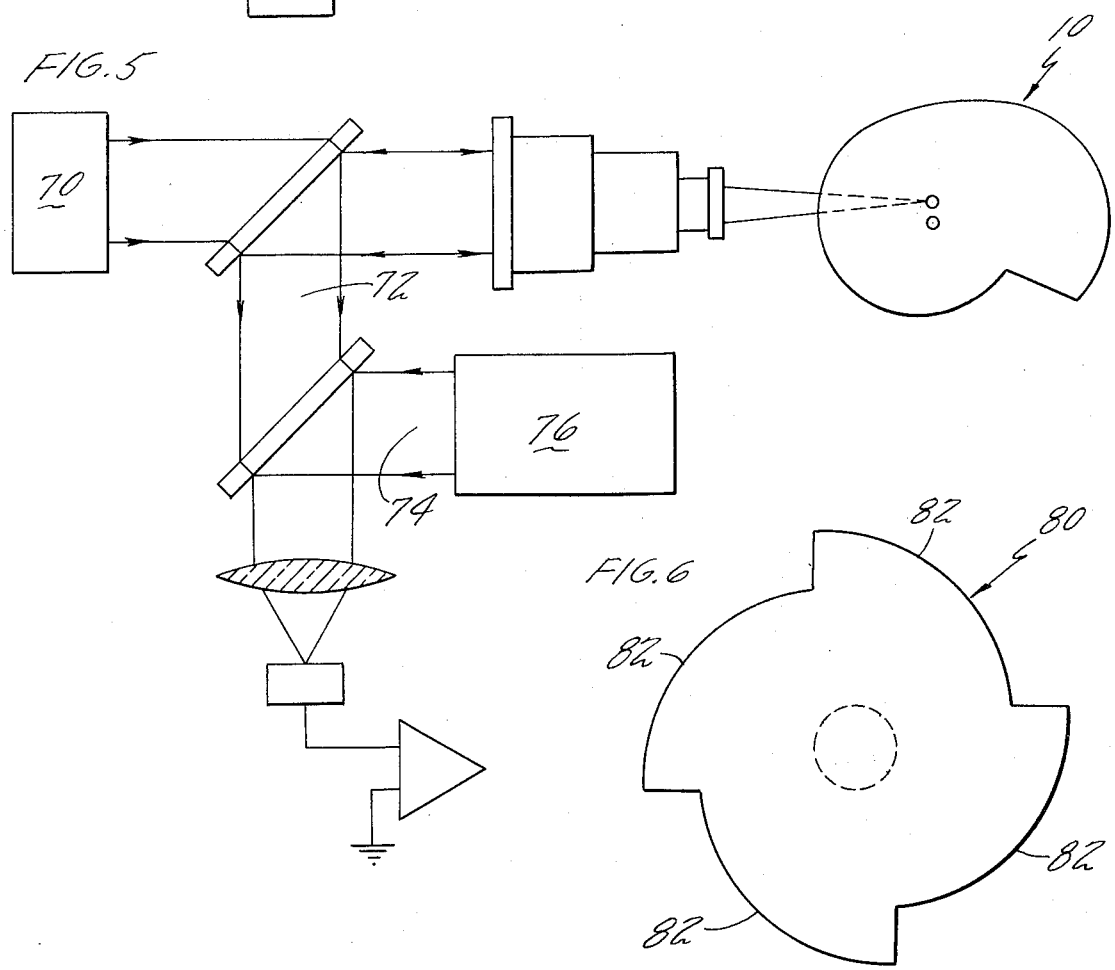

3,776,637

CIRCULAR INVOLUTE REFLECTOR FOR PROVIDING A VARIABLE PATHLENGTH

BACKGROUND OF THE INVENTION

1. Field of the Invention

This invention relates to a variable pathlength device and more particularly to a rotatable reflection surface in the shape of a circular involute for varying the pathlength or providing a Doppler shift of variable magnitude in a beam of radiant energy.

2. Description of the Prior Art

In various applications particularly in the field of optics it is desirable to change the length of an optical path over a distance of several centimeters, often quickly and repeatedly. One such application involves the Fourier type spectrometer. In the operation of such a device, information about the spectral content of an input beam of optical energy is obtained by splitting the beam with a partially transmitting mirror, and recombining the split beams after suitable manipulation. Each of the split beams is directed along a different path, the first beam being reflected off a fixed mirror while the second beam is simultaneously reflected off a moving mirror. The beams are then recombined to produce an interference fringe pattern which is viewed with a suitable detector. One of the difficulties in the use of a Fourier spectrometer is that the rate at which the fringes are formed at the detector must be very much greater than the rate at which the spectral content of the input beam is changing, if the source of light is ephemeral. Also distortious due to frequency jitter and phase change which can mask out the useful fringe information are inevitably present when the duration over which the fringes are accumulated becomes relatively long. The rate at which fringes are formed at the detector in a Fourier spectrometer is equal to twice the velocity at which the moving mirror is displaced divided by the wavelength of the incident optical energy. Therefore a realistically usable fringe rate can be achieved simply by moving the nonfixed mirror at a sufficiently high velocity. Since this motion must ordinarily be repeated cyclically in order to obtain a high signal to noise ratio by averaging many observations, the conventional method of operating such a spectrometer is to cause the movable mirror to travel at the required velocity in a reciprocating manner in the direction normal to the path of the incident radiation. The limitation in this technique is the rate at which fringes can be produced because of the practical limit at which the mirror can be reciprocated without incurring an intolerable amount of vibration in the interferometer. Also as the rate at which the movable mirror is reciprocated increases, the inertia experienced in changing the direction of the mirror very quickly makes movement of the mirror at a linear velocity with respect to the incident beam very difficult to achieve.

Another general application in the field of optics requires that a beam of radiant energy be frequency shifted for use in optical heterodyned and homodyned detection systems. In these applications, a source of coherent energy is mixed with a signal containing some information that is to be retrieved, and the frequency of the coherent energy is varied by introducing a frequency shifting optical element between the source and the point of mixture. These frequency shifters normally exploit some weak physical phenomnon such as the acousto-optic effect, and tend to be expensive and limited in spectral range, frequency range and efficiency.

SUMMARY OF THE INVENTION

A principal object of the present invention is to produce a variable pathlength for a beam of radiant energy. Another object is to produce a variable Doppler shift in the frequency of a beam of radiant energy.

The present invention is predicated on my recognition that if a source beam of radiant energy originates at a point which is fixed with respect to the axis of rotation of a circular involute reflecting surface, is focussed so that all rays of the focussed beam are tangent to the circle of involution and form an angle of incidence which is normal to the mirror, the beam is reflected back along the same path. The invention is further predicated on recognizing that as long as the axis of rotation is concentric with the circle of involution, the beam will retain its normal incidence throughout all rotation of the involute surface; further, the optical pathlength between the origin of the beam and the circular involute varies linearly when the involute is rotated at a constant angular velocity.

The present invention relates to a curved reflector which can be placed in the path of an incident beam of radiant energy and rotated to provide a beam pathlength that is linearly variable in a cyclic manner; the reflection surface conforms to the geometry of a circular involute which is always normal to the incident beam, and the reflected radiation is always redirected back along the path of the incident beam. In further accordance with the present invention, the circular inovlute can be rotated to a fixed position for a change in pathlength or rotated at other than a constant angular velocity to provide a nonlinearly changing pathlength variation.

A primary advantage of the present invention is the ability to change the pathlength of a beam of optical radiant energy continuously through a distance of several centimeters in a cyclic process which is repeatable up to several hundred times per second. Also the reflected beam is directed backward along the same path as the incident beam. The involute surface of the present invention undergoes rotary motion during operation thereby permitting a rapid variation in pathlength with a minimal vibrational disturbance to the overall system. The involute surface can be assembled in either cylindrical or spherical geometry, each of which involves no retrace time between path-length changes resulting in a one hundred percent duty cycle machine.

An inherent characteristic of the present invention is the invariant normal incidence between a source of light which is in fixed relation to the center of rotation of the mirror and the surface of the mirror during all positions of mirror rotation. While the present invention particularly in the preferred embodiments is discussed in terms of optical energy, the invention is readily adapted to other types of radiation including acoustic radiation. The change in the length of the path which an optical beam, deflected in the described manner, undergoes is a linear function of the amount of mirror rotation; the pathlength change is a linear sawtooth function when a mirror is rotated at a constant angular velocity. The present invention is also characterized by the preservation of wavefront coherence between the reflected energy and a reference beam throughout the mirror rotation. Further this invention can produce a Doppler shift in the frequency of the reflected beam; the shift can be up or down depending upon the direction in which the involute mirror is rotated. The configuration of the rotatable reflector can be either a single circular involute or several segments of circular involutes in series; in the case of a single segment mirror being replaced by a multiple segment mirror, the scan rate for the system is increased but the maximum variation of the pathlength during scan is correspondingly decreased. Theoretically the wedge of light incident on the mirror surface should be astigmatic for optimum performance although error analysis has shown that for typical system dimensions, the system performance is not seriously degraded without the optimizing astigmatism in the input optics.

Other objects, features and advantages of the present invention will become more apparent in the light of the following detailed description of preferred embodiments thereof as illustrated in the accompanying drawing and described hereinafter.

BRIEF DESCRIPTION OF THE DRAWING

FIG. 4 is a simplified schematic diagram of a Fourier spectrometer in accordance with the present invention;

FIG. 5 is a simplified schematic diagram of an optical heterodyned receiver system in accordance with the present invention; and FIG. 6 is a simplified elevation view of a segmented involute mirror in accordance with the present invention.

DESCRIPTION OF PREFERRED EMBODIMENTS

Figure 1:
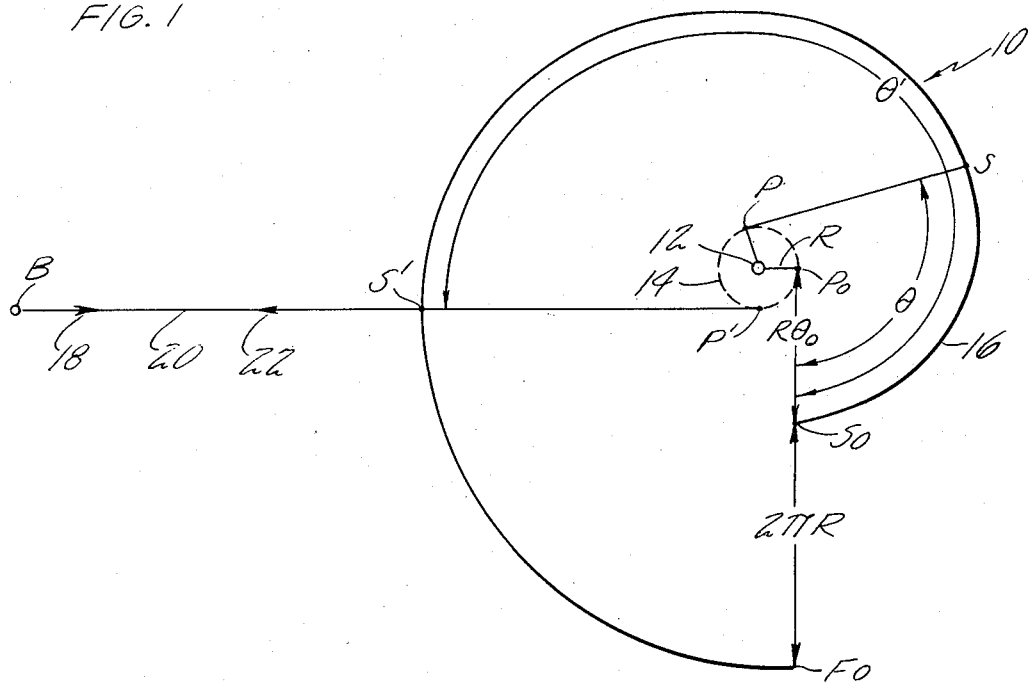
FIG. 1 is a simplified elevation view of a circular involute mirror.

A plan view of a schematic involute mirror in accordance with the present invention is shown in FIG. 1. A circular involute 10 has an axis of rotation 12 which is concentric with a circle of involution 14 having a radius R. A mirrored surface 16 that conforms to the equation of the circular involute and is described in more detail hereinafter can be considered as having a start point $S_o$ and a finish point $F_o$. The points $S_o$ and $F_o$ lie along a straight line which is tangent to the circle of involution 14, normal to the radius R at a point $P_o$, and normal to the surface 16 as shown in FIG. 1. The distance between the point $S_o$ and the circle of involution is arbitrary and is represented by $R\theta_o$ in which $\theta_o$ is a positive constant in radians and determinative of the starting point of the mirror segment on the equation describing the complete circular involute. The distance between the points $S_o$ and $F_o$ is equal to the circumference of the circle of involution. $2\pi R$.

Rotation of the line $P_oS_o$ in a counterclockwise direction to an arbitrary position PS, with the point P remaining on the circle of involution at all times, causes the length of the line $P_oS_o$ to increase by an amount $R\theta$ where $\theta$ is the angle of rotation. Due to the nature of an involute, throughout the rotation of the line $P_oS_o$ to any arbitrary position such as PS, the point P on the circle of involution remains the center of curvature for the point S on the mirrored surface, the distance PS is always the radius of curvature for the point S on the mirrored surface S, and the line PS remains normal to the mirrored surface at S.

If an incident ray 18 which originates at an arbitrarily selected point B that is exterior to the involute and fixed with respect to the axis of rotation 12 is directed toward the point P' along a path 20 and impinges on the mirror at a right angle at the point S', the ray is redirected back along the exact same path as a reflected ray 22. The ray strikes the mirror at the point S' and the radius of curvature for S', S'P' is both tangent to the circle of involution and normal to the involute mirror surface. Since the incident ray forms a right angle at the point of incidence on the mirrored surface, the reflected ray is always directed back along the same path. The radius of curvature S'P' at the point S' is greater than the radius of curvature SP at the point S by the amount $R(\theta'-\theta)$ where $\theta'$ is the angle of rotation required to put S' intermediate of, and on, a straight line joining points B and P'.

Figure 2:
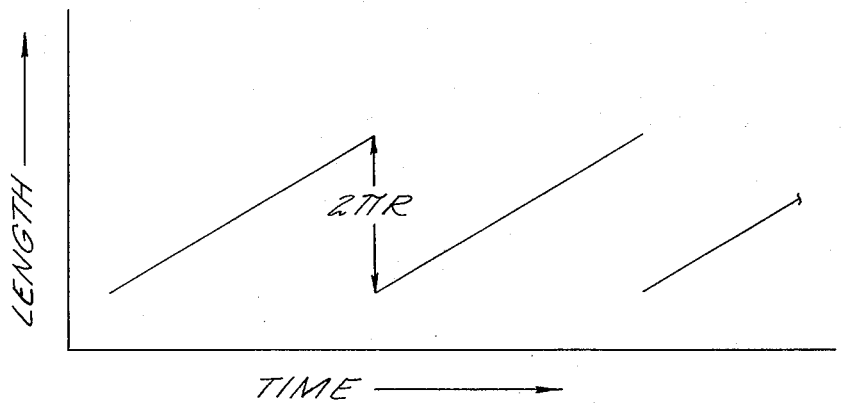
FIG. 2 is an illustration of the pathlength variation versus time for a beam of light incident upon the surface of the mirror which is shown in FIG. 1 and rotated at a constant angular velocity.

The radius of curvature which in FIG. 1 is represented in the mirror positions $\theta_o$, $\theta$, $\theta'$ and $\theta + 2\pi$ as $S_oP_o$, SP, S'P' and $F_oP_o$ respectively, undergoes a variation in length equal to $2\pi R$. This variation is a linear, cyclic change as is shown in FIG. 2. Further, the length of the path 20 between the fixed source B and the mirror surface 16 experiences a related change since the separation between the point B and the point on the circle of involution represented by P' in FIG. 1 remains constant as the mirror is rotated. Rotation of the circular involute at a constant angular rate, causes the points of incidence on the mirrored surface that reflect the incident ray to move toward or away from the fixed reference point B (depending on whether the rotation is clockwise or counterclockwise respectively) at a constant linear rate. The relative motion between the point B and the mirror surface causes the frequency of the incident ray to be Doppler shifted.

The preceding description of the involute mirror can be described with reference being made to FIG. 1. The spiral segment followed by the mirror surface is a circular involute that can be described by a pair of parametric equations, i.e.

$$1 \quad x = R(\cos\theta + (\theta + \theta_o)\sin\theta)$$

$$2 \quad y = R(\sin\theta - (\theta + \theta_o)\cos\theta) \text{ where}$$

$$0 < \theta \le 2\pi,$$

x and y are cartesian coordinates having the axis of rotation 12 as the origin,

R is the radius of the circle of involution, $\theta$ is the angular coordinate in radians which parametrically locates the center of curvature on the circle of involution, and $\theta_o$ is a positive constant in radians that determines the starting point of the mirror segment on the complete circular involute.

From equations (1) and (2) it follows that the slope $S(\theta)$ of the curve at any point on the mirror surface is given by $$3 S(\theta) = \tan\theta,$$

the radius of curvature $D(\theta)$ is given by $$4 \quad D(\theta) = R(\theta + \theta_o), \text{ and}$$

the center of curvature $C(\theta)$ for any point on the mirror surface is given by $$5 \quad C(\theta) = (R\cos\theta, R\sin\theta)$$

If the mirror is rotated counterclockwise through an angle $\beta$ about the axis of rotation, the new position of the spiral segment followed by the mirror surface can be described by the equation $$6 \quad x = R(\cos\theta + (\theta + \theta'_o)\sin\theta)$$
$$7 \quad y = R(\sin\theta - (\theta + \theta'_o)\cos\theta)$$
$$8 \quad S(\theta) = \tan\theta$$
$$9 \quad D(\theta) = R(\theta + \theta'_o)$$
$$10 \quad C(\theta) = (R\cos\theta, R\sin\theta) \text{ where}$$

$$0 \leq \beta < 2\pi$$
$$\theta_o' = \theta_o + 2\pi - \beta \text{ for } 0 < \theta \leq \beta \text{ and}$$
$$\theta_o' = \theta_o - \beta \text{ for } \beta < \theta \leq 2\pi.$$

A comparison of the equations for the mirror surface in the initial position, equations 1 – 5, with the equations for the mirror surface in the rotated position, equations 6 – 10, establishes that the rotation is equivalent to a transformation which does not change the position of the center of curvature $C(\theta)$ or the direction of the radius of curvature, that is the direction perpendicular to the slope $S(\theta)$ of the mirror surface. The comparison of equations also establishes that the radius of the curvature $D(\theta)$ undergoes a change which is linearly related to the angle of rotation with the quantitative change being $R(\theta_o' - \theta_o)$. Therefore radiant energy from any source that forms an angle of incidence of ninety degrees with the surface of the mirror in the initial position continues to experience incidence which is normal to the surface throughout an entire $2\pi$ rotation of the mirror. Further, the pathlength of the energy undergoes a linear change in direct portion to the angle of rotations, with the magnitude of the pathlength change being equal to twice the magnitude of the radius of curvature change.

Figure 3:
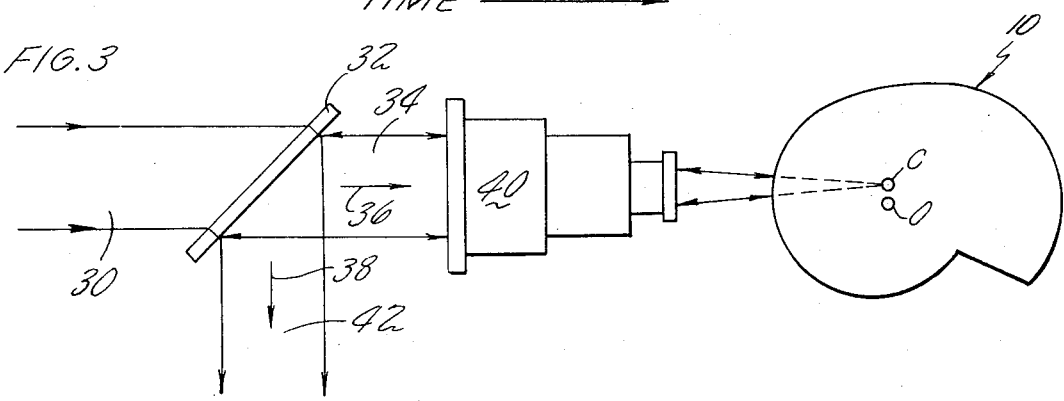
FIG. 3 is a simplified schematic diagram of an optical pathlength modulator.

A typical device using an involute mirror in accordance with the present invention is shown in FIG. 3 in a simple optical path modulator arrangement. An input beam 30 of optical radiation pass through a beam splitter 32 forming a first split beam 34 which travels in a path 36 and a second split beam which travels in a direction 38. The first beam passes through a telescope 40, is reflected back upon itself by the involute mirror 10, and repasses through the telescope in the direction of the beam splitter. The function of the telescope is to focus the first split beam into a wedge whose rays are tangent to the circle of involution; any focussing system for accomplishing this same effect is readily substitutable. The first and second beams interfere with each other at the beam splitter forming an output beam 42. By rotating the involute mirror at a constant angular velocity in the counterclockwise direction as shown the length of the optical path for the first beam leaving the beam splitter, being reflected off the mirror and returning to the beam splitter, is decreased at a linear rate. The round trip change in the length of the optical path is cyclic and equal to twice the difference between the maximum and minimum radii of curvature for the circular involute. Obviously, once per mirror revolution there is a step function increase in the pathlength as the surface discontinuity on the mirror sweeps under the path 36.

A Fourier spectrometer using a circular involute mirror in accordance with the present invention is shown in FIG. 4. An incident beam 50 of radiation is divided by a beam splitter 52 into a first beam which travels in a direction 54 and a second beam which travels in a direction 56. The first beam is reflected back along the path 54 by a fully reflecting mirror 60. The second beam passes through a telescope 62, is reflected by the involute mirror 10 along the path 56, repasses through the telescope and combines with the first beam to form a final beam 64. Collecting optics 66 provide a combined photodetector and recording unit 68 with suitable optical signals that are in turn converted to useful electronic signals. The system shown in FIG. 4 is similar in all respects to a conventional Fourier spectrometer with the exception that a focussing telescope has been included and the circular involute mirror has been substituted for an otherwise present reciprocally displaced mirror. The indicated substitution allows the Fourier spectrometer to be operated at very rapid scanning rates with negligible retrace time. Also the present invention provides an optical pathlength that undergoes a true linear variation when the involute is rotated at constant angular velocity in contrast to the nonlinear pathlength changes that are characteristic of convention mirrors that experience acceleration. The involute spectrometer is essentially vibration free.

An alternate application of the present invention is shown in FIG. 5 as an optical heterodyne receiver system. A local oscillator 70 provides the energy which is split, passed through a telescope and reflected back upon itself by the involute mirror 10. A reformed beam 72 is beat against the signal source beam 74 provided by a signal source 76 and directed onto the collecting optics. The effect of the Doppler shift associated with reflection from the rotating involute surface is to produce an offset in beat frequency between the local oscillator and the signal source. The introduction of such offset frequency is known to produce a much higher quality signal to noise ratio output.

An alternate embodiment of the basic involute mirror is shown in FIG. 6. The mirror 80 is comprised of four individual segments 32 of an involute spiral. The number of segments which can be used in such an embodiment is somewhat arbitrary, however, as the number of segments is increased the maximum variation for any given pathlength is proportionately decreased and the repetition rate at which the length variation can be cycled is increased proportionately. The involute mirrors shown in FIGS. 1 and 6 appear in edge view, however it should be understood that the invention can be practiced with the mirrored surface actually conforming to either cylindrical or spherical optics.

Although the invention has been shown and described with respect to preferred embodiments thereof it should be understood to those skilled in the art that the foregoing and other changes and omissions in the form and detail thereof can be made therein without departing from the spirit or the scope of the invention which is to be limited and defined only as set forth in the following claims.

CLAIMS

Having thus described a typical embodiment of my invention, that which I claim as new and desire to secure by letters Patent of the United States is:

1. The method of modulating the pathlength of a beam of radiant energy with a reflector having a surface in the form of a circular involute including the steps of:
   locating the reflector in the path of the beam;
   focussing the beam;
   directing the focussed beam so that the focussed rays are focussed substantially on the circle of involution of the reflector;
   directing the focussed beam further at the reflector to form an angle of incidence that is substantially normal to the surface; and
   rotating the reflector while maintaining the beam normal to the surface and the focussed rays tangent to the circle of involution.

2. The method according to claim 1 in which the reflector is rotated at a constant angular velocity thereby causing the pathlength to be modulated at a linear rate.

3. A reflector surface comprising a spiral curve in the form of a circular involute.

4. The invention according to claim 3 in which the reflector surface comprises more than one continuous segment.

5. A modulator for cyclically varying the pathlength of an input beam of radiant energy comprising:
   a beam splitter for dividing the input beam into a first split beam which travels in a first direction and a second split beam which travels in a second direction;
   means for focussing the first split beam; and
   a rotatable circular involute reflector surface for reflecting the focussed beam back to the beam splitter, through the focussing means and along the same path followed in the forward direction whereby the reflected beam and the second split beam recombine at the beam splitter and are reflected in the second direction.

* * * * *

UNITED STATES PATENT OFFICE
CERTIFICATE OF CORRECTION

Patent No. 3,776,637                    Dated December 4, 1973

Inventor(s)   RICHARD HECHT

It is certified that error appears in the above-identified patent and that said Letters Patent are hereby corrected as shown below:

Column 2, lines 32 & 33, "inovlute" should read -- involute --; Column 4, line 46, "1" should read -- (1) --; line 47, "2" should read -- (2) --; line 66, "3" should read -- (3) --; Column 5, line 1, "4" should read -- (4) --; line 5, "5" should read -- (5) --; line 9, "equation" should read -- equations --; line 10, "6" should read -- (6) --; line 12, "7" should read -- (7) --; line 14, "8" should read -- (8) --; line 15, "9" should read -- (9) --; line 17, "10" should read -- (10) --; Column 6, line 46, "32" should read -- 82 --.

Signed and sealed this 14th day of May 1974.

(SEAL)
Attest:

EDWARD M. FLETCHER, JR.
Attesting Officer

C. MARSHALL DANN
Commissioner of Patents